(12) United States Patent
Chen et al.

(10) Patent No.: US 9,687,785 B2
(45) Date of Patent: Jun. 27, 2017

(54) CATALYZED FILTER FOR TREATING EXHAUST GAS

(71) Applicant: Johnson Matthey Public Limited Company, London (GB)

(72) Inventors: Hai-Ying Chen, Conshohocken, PA (US); Debnath De, Malvern, PA (US); Wendy Manning, Barto, PA (US); Julian Peter Cox, Malvern, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/292,056

(22) Filed: May 30, 2014

(65) Prior Publication Data

US 2014/0356265 A1    Dec. 4, 2014

Related U.S. Application Data

(60) Provisional application No. 61/829,303, filed on May 31, 2013.

(51) Int. Cl.
| | | |
|---|---|---|
| *B01D 53/94* | (2006.01) | |
| *F01N 3/022* | (2006.01) | |
| *F01N 3/035* | (2006.01) | |
| *B01J 35/10* | (2006.01) | |
| *B01J 29/03* | (2006.01) | |
| *B01J 29/04* | (2006.01) | |
| *B01J 29/072* | (2006.01) | |

(52) U.S. Cl.
CPC ....... *B01D 53/9472* (2013.01); *F01N 3/0222* (2013.01); *F01N 3/035* (2013.01); *F01N 2510/0682* (2013.01); *Y02T 10/24* (2013.01)

(58) Field of Classification Search
CPC .... B01J 29/0333; B01J 29/044; B01J 29/072; B01J 35/1052; B01J 35/108; B01D 53/9472; F01N 3/0222; F01N 3/035; F01N 2510/0682
USPC ...... 502/66, 74, 87, 439; 422/170, 177, 180; 423/239.1, 239.2
See application file for complete search history.

(56) References Cited

U.S. PATENT DOCUMENTS

| | | | |
|---|---|---|---|
| 7,485,170 B2 * | 2/2009 | Beall et al. ...................... 55/523 |
| 7,566,426 B2 * | 7/2009 | Zuberi ........................... 422/180 |
| 7,601,662 B2 * | 10/2009 | Bull et al. ......................... 502/60 |
| 7,722,829 B2 * | 5/2010 | Punke et al. .................. 422/180 |
| 7,785,544 B2 * | 8/2010 | Alward et al. ................ 422/179 |
| 7,902,107 B2 | 3/2011 | Patchett et al. | |

(Continued)

FOREIGN PATENT DOCUMENTS

| | | |
|---|---|---|
| DE | 102005005663 A1 | 8/2006 |
| JP | 2006007117 A | 1/2006 |

*Primary Examiner* — Cam N. Nguyen
(74) *Attorney, Agent, or Firm* — Gary D. Mangels

(57) ABSTRACT

Provided is a diesel particulate filter capable of removing soot from an exhaust gas while operating at low backpressure, the filter comprising (a) a wall-flow filter substrate having a mean pore size, an inlet side, an outlet side, and a porous interior between the inlet and outlet sides; and (b) a catalyst composition coated from the outlet side of the substrate, wherein the catalyst composition has a $d_{50}$ particle size distribution, wherein the $d_{50}$ particle size distribution is greater than or equal to the mean pore size divided by 4.9, and wherein the inlet side is substantially free of a catalyst coating.

23 Claims, 3 Drawing Sheets

(56) References Cited

U.S. PATENT DOCUMENTS

| | | | |
|---|---|---|---|
| 7,919,051 B2* | 4/2011 | Li et al. | 422/171 |
| 7,951,338 B2* | 5/2011 | Miyairi et al. | 422/177 |
| 7,972,400 B2* | 7/2011 | Mizuno et al. | 55/482 |
| 8,038,954 B2* | 10/2011 | Li | 422/180 |
| 8,101,146 B2* | 1/2012 | Fedeyko et al. | 423/213.2 |
| 8,101,147 B2* | 1/2012 | Andersen et al. | 423/213.2 |
| 8,119,075 B2* | 2/2012 | Dettling et al. | 422/180 |
| 8,122,603 B2* | 2/2012 | Patchett et al. | 29/890 |
| 8,137,648 B2* | 3/2012 | Jen et al. | 423/210 |
| 8,293,182 B2* | 10/2012 | Boorse et al. | 422/180 |
| 8,329,607 B2* | 12/2012 | Kazi et al. | 502/66 |
| 8,347,614 B2* | 1/2013 | Andersen et al. | 60/299 |
| 8,398,925 B2* | 3/2013 | Chiffey et al. | 422/177 |
| 8,591,820 B2* | 11/2013 | Boger et al. | 422/180 |
| 8,603,432 B2* | 12/2013 | Andersen et al. | 423/700 |
| 8,609,032 B2* | 12/2013 | Boger et al. | 422/180 |
| 8,663,587 B2* | 3/2014 | Boorse | 423/213.2 |
| 8,679,418 B2* | 3/2014 | Ramberg | F01N 3/28 422/129 |
| 8,735,311 B2* | 5/2014 | Bull et al. | 502/60 |
| 8,758,695 B2* | 6/2014 | Neubauer et al. | 422/180 |
| 8,789,356 B2* | 7/2014 | Phillips et al. | 60/274 |
| 8,883,100 B2* | 11/2014 | Paulus et al. | 423/213.2 |
| 8,906,820 B2* | 12/2014 | Fedeyko et al. | 502/60 |
| 8,940,242 B2* | 1/2015 | Chen et al. | 422/177 |
| 8,940,259 B2 | 1/2015 | Brown et al. | |
| 9,039,982 B2* | 5/2015 | Patchett et al. | 422/177 |
| 9,039,983 B1* | 5/2015 | Patchett et al. | 422/177 |
| 9,039,984 B1* | 5/2015 | Patchett et al. | 422/177 |
| 2007/0140928 A1 | 6/2007 | Beall et al. | |
| 2009/0155525 A1* | 6/2009 | Li | B01D 53/944 428/116 |
| 2010/0175372 A1 | 7/2010 | Lambert et al. | |
| 2011/0243801 A1* | 10/2011 | Li | B01D 53/944 422/168 |
| 2012/0213673 A1* | 8/2012 | Andersen et al. | 422/170 |
| 2012/0258032 A1* | 10/2012 | Phillips et al. | 423/239.2 |
| 2012/0275977 A1* | 11/2012 | Chandler et al. | 423/213.5 |
| 2012/0301378 A1* | 11/2012 | Fedeyko et al. | 423/213.5 |
| 2012/0301379 A1* | 11/2012 | Fedeyko et al. | 423/213.5 |
| 2014/0322113 A1* | 10/2014 | Blakeman et al. | 423/212 |

* cited by examiner

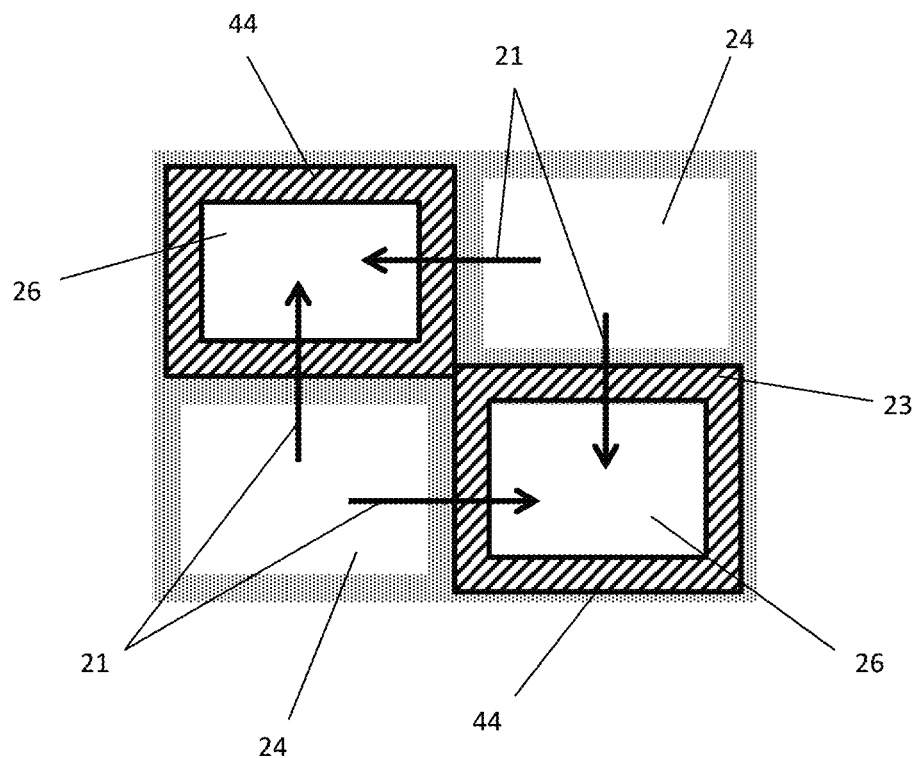

CATALYZED FILTER FOR TREATING EXHAUST GAS

BACKGROUND

1. Field of Invention

The present invention relates to articles for treating combustion exhaust gas. More particularly, the present invention relates to particulate filters coated with a catalyst for reducing soot and other undesirable components from lean burn combustion exhaust gas.

2. Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that does not generate other noxious or toxic substances.

Certain lean-burn engines, such as diesel engines, tend to produce an exhaust gas with a considerable amount of soot and other particulate matter. Soot emissions can be remedied by passing the soot-containing exhaust gas through a diesel particulate filter (DFP), such as a wall-flow filter.

To reduce the amount of space required for an exhaust system, it is often desirable to design individual exhaust components to perform more than one function. For example, applying a catalyst coating to a wall-flow filter substrate serves to reduce the overall size of an exhaust treatment system by allowing one substrate to serve two functions, namely remove soot and serve as a substrate for a heterogeneous catalyst. However, coating the filter with an operable amount of catalyst can undesirably increase the backpressure across the filter which, in turn, reduces engine performance and fuel economy. This is particularly true for high performance catalyst washcoats, such as selective catalytic reduction (SCR) catalyst comprising transition metal promoted zeolites.

Many attempts have been made to prepare washcoated DPFs having a suitably high amount of catalyst and suitably low backpressure. However, there remains a need for DFPs which produces a relatively low backpressure when coated with an effective amount of an SCR catalyst.

SUMMARY OF THE INVENTION

Applicants have surprisingly found that the backpressure across a wall-flow filter can be reduced by coating the filter from the outlet side only with a catalyst washcoat, provided that the washcoat contains catalyst particles that are large relative to the filter's mean pore size. More particularly, coating from only the outlet side of a filter with a large particle washcoat unexpectedly reduces the soot loaded backpressure across the filter compared to the same filter having an equivalent amount of the same catalyst coating applied only from the inlet side of the filter or having an equivalent amount of the same catalyst coating applied evenly from both the inlet side and outlet sides of the filter. This result is also surprising because small particle washcoats applied only to the outlet side of the same filter do not produce a comparable benefit, and in fact, result in higher backpressures.

Accordingly, provided is a diesel particulate filter comprising (a) a wall-flow filter substrate having a mean pore size, an inlet side, an outlet side, and a porous interior between the inlet and outlet sides; and (b) a catalyst composition coated from the outlet side of the substrate, wherein the catalyst composition has a $d_{50}$ particle size distribution, wherein said $d_{50}$ particle size distribution is greater than or equal to the mean pore size divided by $4.9\pm0.1$, and wherein the inlet side is substantially free of a catalyst coating.

In another aspect of the invention, provided is a system for treating a lean-burn exhaust gas comprising (a) a diesel particulate filter described herein; and (b) at least one exhaust system component in fluid communication with the diesel particulate filter, wherein the exhaust system component is selected from the group consisting of an source of $NO_2$ disposed upstream of the diesel particulate filter, a source of reductant disposed upstream of the diesel particulate filter, an AMOX catalyst, a $NO_x$ trap, a $NO_x$ absorber catalyst, a diesel oxidation catalyst, and an SCR catalyst.

In yet another aspect of the invention, provided is a method for reducing soot in a lean burn exhaust gas comprising the steps of (a) contacting an exhaust gas stream carrying soot and optionally containing $NO_x$, with a diesel particulate filter described herein; (b) trapping at least a portion of the soot on and/or in the diesel particulate filter while allowing the exhaust gas to pass through the diesel particulate filter; (c) periodically and/or continuously burning the trapped soot to regenerate the filter; and optionally (d) contacting the exhaust gas with a SCR catalyst coated from the outlet side of the filter to reduce the concentration of NOx in exhaust gas.

BRIEF DESCRIPTION OF THE FIGURES

FIG. 3 is a cross-sectional diagram of a diesel particulate filter having a catalyst coating according to an embodiment of the invention.

DETAILED DESCRIPTION OF PREFERRED EMBODIMENTS OF THE INVENTION

The invention, in part, is directed to a catalytic filter for improving environmental air quality and, in particular, for improving exhaust gas emissions generated by diesel and other lean burn engines. Exhaust gas emissions are improved, at least in part, by reducing one or more gaseous components, such as $NO_x$ and $NH_3$, and reducing particulate matter concentrations in the lean exhaust gas. Accordingly, preferred catalytic filters comprise a porous substrate, such as a diesel particulate filter (DFP), which serves both to mechanically remove particulate matter from an exhaust gas stream passing through the porous substrate and to support a catalyst composition useful for removing undesirable gaseous components in the exhaust gas.

In certain embodiments, the filter is a wall-flow filter substrate having a certain mean pore size, an inlet side, an outlet side, and a porous interior between the inlet and outlet sides, and a catalyst composition having a $d_{50}$ particle size distribution that is coated from the outlet side of the substrate, wherein the $d_{50}$ particle size distribution is greater than or equal to the mean pore size divided by 4.8, 4.9, or 5.0, and wherein the inlet side is substantially free of a catalyst coating.

Preferred filter substrates include diesel particulate filters, and preferred diesel particulate filters for use in mobile applications include wall-flow filters, such as wall-flow ceramic monoliths. Other filter substrates include flow through filters, such as metal or ceramic foam or fibrous filters. In addition to cordierite, silicon carbide, and ceramic, other materials that can be used for the porous substrate include, but are not limited to, alumina silica, aluminum nitride, silicon nitride, aluminum titanate, α-alumina, mullite, pollucite, zircon, zirconia, spinel, borides, feldspar, titania, fused silica, borides, ceramic fiber composites, mixtures of any of these, or composites comprising segments of any two or more thereof. Particularly preferred substrate include cordierite, silicon carbide, and aluminum titanate (AT), wherein AT is the predominate crystalline phase.

Figure 1A:
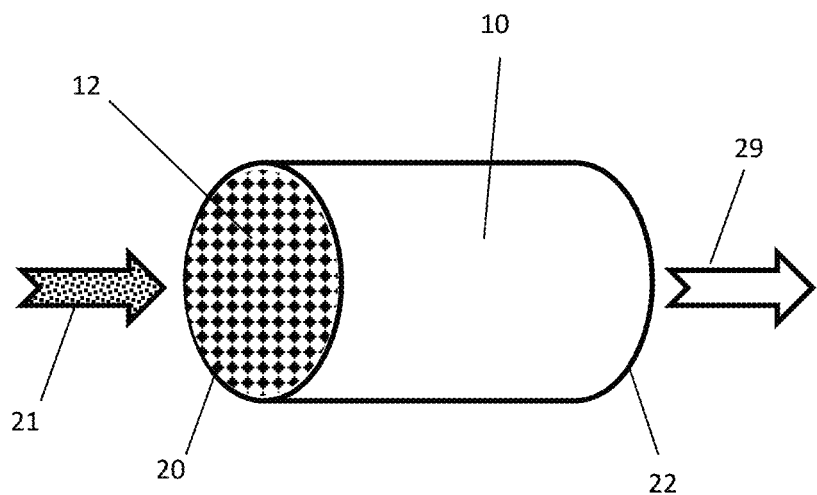
FIG. 1A is a diesel particulate filter.

Turning to FIG. 1A, shown is a wall-flow filter substrate 10 according to an embodiment of the invention. The wall-flow filter has a front 20 and a rear 22, wherein the front 20 is designed to receive exhaust gas 21 prior to filtration and the rear 22 is designed to allow cleaned exhaust gas 29 to exit the filter 10.

Figure 1B:
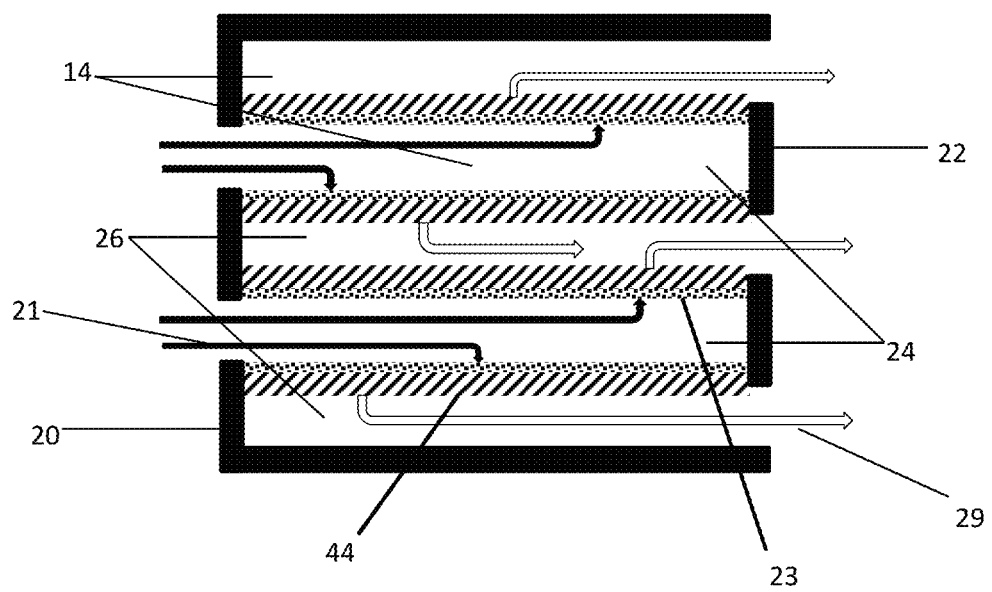
FIG. 1B is a cross-sectional view of a diesel particulate filter.

In FIG. 1B, a cross section of a portion of a wall flow filter is shown. Wall-flow filter substrate has many square parallel channels 14 separated by thin porous walls 23 coated from the outlet side with a catalyst washcoat 44. The channels 14 extend in an axial direction from the front 20 of the substrate to the substrate's rear 22. The channels 14 are open only on one end. The opposite end of the channel is plugged. The plugged ends are arranged in alternating, checker-board pattern 12 between the front and rear so that exhaust gas 21 enters the channels 24 open to the front of the substrate, passes through the thin porous walls 23, enters the channels 26 open to the rear of the substrate, and then exits the substrate. The walls 23 have a porosity and pore size that are adequate for gas permeability, but are effective at trapping a major portion of the particulate matter, including soot, particularly when combined with a catalyst composition described herein. That is, as exhaust gas passes through the filter, particulate matter carried by the exhaust gas becomes trapped by the thin porous wall, thereby allowing particulate-free exhaust gas to exit the filter. The particulate matter accumulates on the filter until the filter is regenerated.

The cross-sectional shape of the channels is not particularly limited and can be, for example, square, circular, oval, rectangular, triangular, hexagonal, and the like. Wall-flow filter substrates for diesel engines typically contain about 100-800 cpsi (channels per square inch), for example about 100 to about 400 cpsi, about 200 to about 300 cpsi, or about 500 to about 600 cps. In certain embodiments, the walls have an average wall thickness of about 0.1 to about 1.5 mm, for example about 0.15 to about 0.25 mm, about 0.25 to about 0.35 mm, or about 0.25 to about 0.50 mm.

Figure 2A:
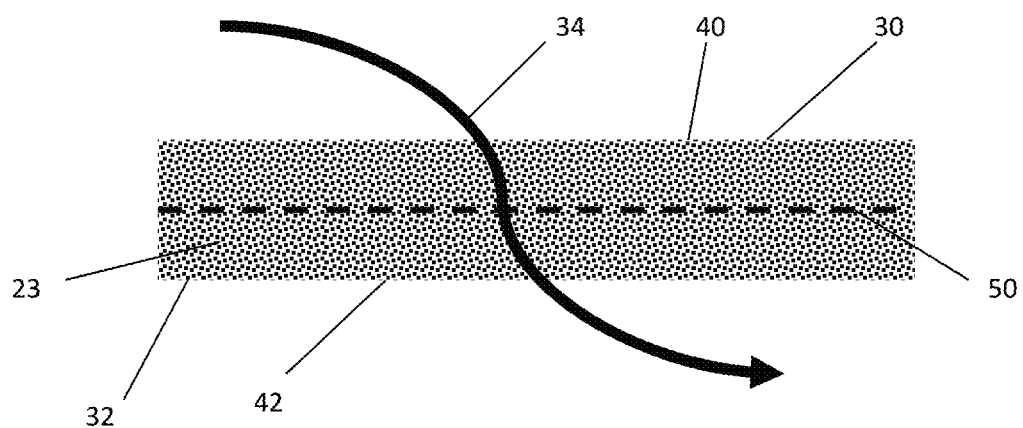
FIG. 2A is a diagram of a thin porous wall of a diesel particulate filter.
Figure 2B:
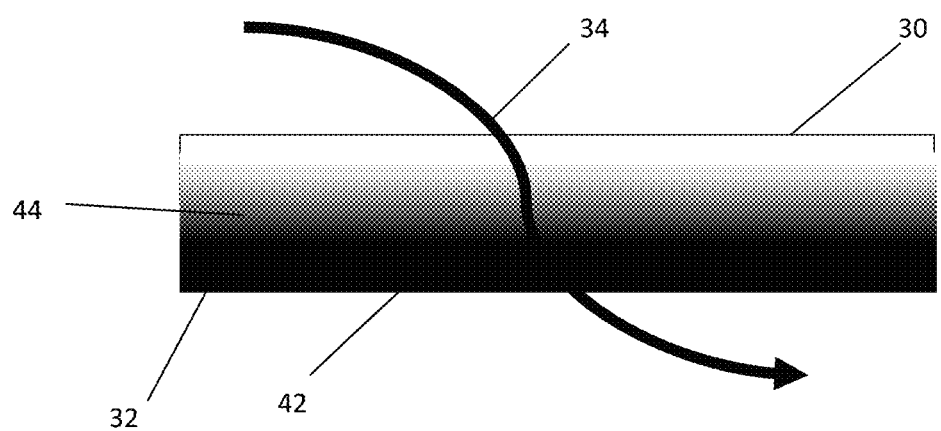
FIG. 2B is a diagram of a thin porous wall of a diesel particulate filter having a catalyst coating according to an embodiment of the invention.

Turning to FIGS. 2A and 2B the porous walls 23 have an inlet side 30 and an outlet side 32 relative to the typical direction of exhaust gas flow 34 through the walls. The inlet side 30 has an inlet surface 40 that is exposed to the channels 24 open to the front of the substrate, and the outlet side 32 has an outlet surface 42 that is exposed to the channels 26 open to the rear of the substrate. The filter also has a center 50 that is equidistant from the outlet surface 42 and inlet surface 40. As used herein, the term "inlet side" 30 with respect to the thin porous wall means the inlet surface 40 and the portion of the wall 23 from the inlet surface 40 to a depth of not more than about 10 percent, and more preferably about 10, about 5, or about 1 percent, of the distance between the inlet surface 40 and outlet surface 42. The term "outlet side" 32 with respect to the thin porous wall means outlet surface 42 and the portion of the wall 23 from the outlet surface 42 to a depth of not more than about 10 percent, and more preferably about 10, about 5, or about 1 percent, of the distance between the outlet surface 42 and inlet surfaces 40. The porous wall also has an interior portion that is between the inlet side 30 and the outlet side 32. In certain embodiments, the thickness of the interior is about 80 percent, and more preferably about 90 percent, of the total wall thickness. A catalyst coating is applied from the outlet side of the filter substrate and forms a catalyst coating gradient 44 within the outlet side, within the interior portion, and/or on the outlet surface, with the highest concentration of catalyst being towards the outlet surface.

FIG. 3 shows a cross-sectional diagram of a catalyst loaded filter according to an embodiment of the present invention. Here, it can be seen that exhaust gas flows is a direction 21 from the inlet channels 24, through the catalyst coating 44, and into the outlet channels 26.

The filter's useful range of porosity and mean pore size are not particularly limited but are correlated to, or are used to determine, the particle size of the catalyst coating. As described herein, the filter substrate's porosity and mean pore size are determined based on a bare filter (e.g., without a catalyst coating). In general, the porosity of the substrate is at least about 40%, more preferably at least about 50%, for example about 50 to about 80%, about 50 to about 70 percent, or about 55 to about 65 percent. Porosity may be measure by any suitable means, including mercury porosimetry. In general, the mean pore size of the substrate is about 8 to about 40μm, for example about 8 to about 12μm, about 12 to about 20μm, or about 15 to about 25μm. In certain embodiments, at least about 50%, and more preferably at least about 75% of the pores are within these ranges, based on the total pore volume and/or total number of pores. Mean pore size can be determined by any acceptable means, including by mercury porosimetry. In certain embodiments, the filter substrate has a mean pore size of about 12 to about 15 μm and a porosity of about 50 to about 55%. In preferred embodiments, the filter substrate has a mean pore size of about 18 to about 20 μm and a porosity of about 55 to about 65%. These ranges correspond to a preferred catalyst composition d50 particle distribution of about 3.75 to about 5 microns.

In certain embodiments, wall-flow substrates are high efficiency filters. Efficiency is determined by the weight percent of particulate matter having a specific size removed from the untreated exhaust gas upon passing through a wall-flow substrate. Therefore, efficiency is relative to soot and other similarly sized particles and to particulate concentrations typically found in conventional diesel exhaust gas. Particulates in diesel exhaust can range in size from 0.05 microns to 2.5 microns. Thus, the efficiency is based on this range. Wall flow filters for use with the present invention preferably have an efficiency of at least 70%, at least about 75%, at least about 80%, or at least about 90%. In certain embodiments, the efficiency will preferably be from about 75 to about 99%, about 75 to about 90%, about 80 to about 90%, or about 85 to about 95%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

In certain embodiments, the wall-flow filter substrate is an extruded catalytic body. Extruded catalytic bodies are distinguishable from non-catalytic substrates in that former involves a catalyst composition as part of the porous walls of the substrate, whereas the latter involves an inert substrate optionally having a catalyst coating applied to its porous walls. Thus, in certain embodiments, the thin porous walls of the filter substrate comprise one or more catalysts but do not contain a catalyst coating. In certain other embodiments, the thin porous walls of the filter do not contain a catalyst except a catalyst coating. In certain embodiments, inert substrates are preferred due to their structural and performance properties and their versatility.

Very generally, the production of an extruded solid body containing the source of catalyst involves blending the catalyst material, a binder, an optional organic viscosity-enhancing compound into a homogeneous paste which is then added to a binder/matrix component or a precursor thereof and optionally one or more of stabilized ceria and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body.

The wall-flow filter substrates of the present invention contain a catalyst composition loaded from the outlet side of the filter, preferably as a coating. For the avoidance of doubt, a catalyst composition on the outlet side of the filter means that at least 90 weight percent of the catalyst composition is on the outlet side and interior portion of the filter. In certain embodiments, at least about 95 weight percent of the catalyst composition is on the outlet side and interior portion of the filter. Preferably, essentially all of the catalyst composition is on the outlet side and interior portion of the filter.

Preferably, the catalyst composition forms a concentration gradient between the outlet surface of the filter and the inlet side of the filter, wherein the concentration is greatest towards the outlet surface. In certain embodiments, at least 50, 75, 90, 95, or 99 weight percent of the catalyst composition is between the outlet surface and center of the filter.

The wall-flow filter substrate preferably has an inlet side that is substantially free of catalyst coatings. The term "substantially free" with respect to a particular zone on the filter means that the zone does not contain a catalyst coating, or if a catalyst coating is present, the loading is low enough so as not to increase the backpressure across the filter by more than 5% at a median soot load produced during typical operating conditions relative to a bare filter or a filter without such coating. For example, a filter having an inlet side substantially free of catalyst may contain an inlet side coating of less than 0.1 g/in$^3$, more preferably less than 0.05 g/in$^3$, and even more preferably less than 0.01 g/in$^3$. In certain embodiments the inlet side of the filter is substantially free of a catalyst coating, the total amount of the catalyst coating on the inlet side is less than about 5 weight percent, and more preferably less than about 1 weight percent, and even more preferably less than 0.1 weight percent of the total catalyst coating on the filter, and is preferably less than about 5 weight percent, and more preferably less than about 1 weight percent, and even more preferably less than 0.1 weight percent of the catalyst coating on the outlet side of the filter. For avoidance of doubt, the catalyst coating referred to herein does not include catalyst material that forms part of the substrate (e.g., an extruded catalytic body).

In some embodiments, the wall-flow filter substrate has an interior that is substantially free of catalyst coatings. For example, a filter having an interior substantially free of catalyst may contain an interior coating of less than 0.2 g/in$^3$, and more preferably less than 0.05 g/in$^3$. In certain embodiments in which a catalyst coating is present on the interior wall of the filter, the total amount of the catalyst coating is less than about 5 weight percent, more preferably less than about 1 weight percent, and even more preferably less than 0.1 weight percent of the total catalyst coating on the filter and is preferably less than about 5 weight percent, preferably less than about 1 weight percent, and even more preferably less than 0.1 weight percent of the total catalyst coating on the outlet side of the filter. For avoidance of doubt, the catalyst coating referred to herein does not include catalyst material that forms part of the substrate (e.g., an extruded catalytic body).

The catalyst coating referred to herein does not include non-catalytic membranes or other non-catalytic thin layer coatings that may be applied to the filter wall as a processing aide (e.g., to improve adhesion of the catalytic coating to the filter wall), a passivation layer, or to reinforce, strengthen, or stabilize the filter wall. Preferably, a non-catalytic layer, if present, has a thickness and/or loading that does not significantly affect the backpressure of the filter, for example, does not increase or decrease the backpressure by more than about 5% compared to a similar filter substrate without the non-catalytic coating. Thus, in certain embodiments, the filter substrate contains a non-catalytic layer in addition to the catalyst coating (e.g., a catalyst coating applied to a passivated substrate). In other embodiments, the filter substrate contains a catalyst coating, but is free from non-catalytic coatings (e.g., a catalyst coating applied to an unpassivated substrate).

In certain embodiments, the catalyst composition loaded from the outlet side of the filter is arranged as a single layer or zone. In other embodiments, the catalyst composition on the outlet side of the filter is arranged as two or more layers or zones wherein each layer or zone comprises the same or different catalyst compositions. For embodiments in which the catalyst composition comprises two or more layers, the d50 particle size distribution is based on the catalyst composition as whole.

In certain preferred embodiments, a catalyst coating comprises a consecutive first catalytic layer and a second catalytic layer on the outlet side of the substrate. As used herein, the term "consecutive" with respect to the layers means that each layer is contact with its adjacent layer(s) and that the layers as a whole are arranged one on top of another on the substrate. As used herein, the terms "first layer" and "second layer" are used to describe the relative positions of catalyst layers in the catalyst article with respect to the normal direction of exhaust gas flow through, past, and/or over the catalyst article. Under normal exhaust gas flow conditions, exhaust gas contacts the first layer prior to contacting the second layer. In certain embodiments, the first layer is applied to an inert substrate as a bottom layer and the second layer is top layer that is applied over the second layer.

The catalyst composition preferably has a large particle size relative to the mean pore size of the filter. Preferably, the catalyst composition has a $d_{50}$ particle size distribution that is greater than or equal to the mean pore size divided by 4.9. The term "$d_{50}$ particle size distribution", means the median diameter or the medium value of the particle size distribution. It is the value of the particle diameter at 50% in the cumulative distribution. As used herein, the term "particle size distribution" means the number of particles that fall into a size range as a percentage of the total number of all sizes in a sample.

In certain embodiments, the particle size distribution of the catalyst composition is measured based on the particle size of the catalytically active component. In other embodiments, the particle size of the catalyst composition is measured based on the catalyst composition as a whole. In certain embodiments, the catalyst composition is part of a washcoat and in other embodiments, the catalyst composition is a washcoat (i.e., includes other non-catalytic components) or catalyst coating. That is, a measurement of the particle size distribution is not limited to the catalyst particles in the coating, but instead includes all particles in the coating, such as binders, rheology modifiers, etc. In certain embodiments, the particles in a distribution contain at least 50%, and more preferably at least 75%, (by number and/or by weight) of catalyst particles.

Particle size distribution can be measured by any conventional means. In certain embodiments, the catalyst coating has a $d_{50}$ particle size distribution of about 1.5 to about 15 μm, preferably about 3 to about 8 μm, such as about 3.5 to about 5 μm. Preferably, the filter substrate has a relatively large mean pore size (e.g., greater than about 10 μm) and the catalyst coating has a relatively large $d_{50}$ particle size distribution (e.g., greater than about 3.5 μm). In certain embodiments, the filter has a mean pore size of about 10 to about 25 μm, such as about 12 to about 15 μm or about 17 to about 21 μm, a porous of about 55 to about 70%, and catalyst coating has a $d_{50}$ particle size distribution of about 3.75 to about 4.5 μm.

Certain catalyst coatings for the present invention have a $d_{10}$ particle size distribution of at least 0.75 μm, preferably at least about 1 μm, for example about 1 to about 2 μm, about 1 to about 1.5 μm, or about 1 μm, 2 μm, or 3 μm. Certain catalyst coating for the present invention have a $d_{90}$ particle size distribution of less than about 15 μm, preferably less than about 10 μm, for example about 6 μm, 7 μm, or 8 μm. As used herein, "$d_{10}$ particle size distribution" means that 90 percent of the particles in a sample are greater than the stated value. As used herein, "$d_{90}$ particle size distribution" means that less than 90 percent of the particles in a sample are less than the stated value. In certain embodiments, the catalyst coating has a $d_{10}$ particle size distribution of about 1 to about 1.5 μm, a $d_{50}$ particle size distribution of about 3.75 to about 4.5 μm, and a $d_{90}$ particle size distribution of about 7.5 to about 9 μm. In certain other embodiments, the catalyst coating has a $d_{10}$ particle size distribution of about 1.5 to about 2 μm, a $d_{50}$ particle size distribution of about 3.5 to about 4 μm, and a $d_{90}$ particle size distribution of about 7 to about 8 μm.

The loading concentration of the catalyst coating is not particularly limited, provided that the catalyst composition is present in an amount effective to catalyze the targeted exhaust gas component. Preferably, the catalyst composition is present in a concentration of at least about 0.1, and preferably at least about 0.3 g/in³. In certain embodiments, the catalyst composition has a loading of about 0.5 to about 4 g/in³, more preferably about 0.75 to about 2 g/in³, and even more preferably about 1.0 to about 1.5 g/in³ or about 1.5 to about 2.5 g/in³. The loading concentration is preferable measured based on the active catalytic component, but may be based on entire catalyst coating.

Preferred catalyst compositions include those useful for reducing the concentrations of $NO_x$, $NH_3$, $SO_x$, CO and/or hydrocarbons in the exhaust gas. Other useful catalyst include $NO_x$ absorbers and $NO_x$ traps. Preferably, the catalyst is a heterogeneous catalyst that comprises a metal on and/or in a high surface area material, such as a molecular sieve or refractory metal oxide. The metal is preferably impregnated, doped, or supported by the high surface area material.

Preferred metals are transition metal and/or a platinum group metal. Examples of useful metals include copper, nickel, zinc, iron, tin, tungsten, molybdenum, cobalt, bismuth, titanium, zirconium, antimony, manganese, chromium, vanadium, niobium, ruthenium, rhodium, palladium, gold, silver, indium, platinum, iridium, rhenium, and mixtures thereof, with copper, manganese, and iron being particularly preferred. The catalysts may also include other stabilizing metals such as calcium, magnesium, potassium, and/or rare earth metals such as cerium and lanthanum. These materials are particularly well suited for use as an SCR catalyst, AMOX catalyst, $NO_x$ traps, $NO_x$ absorbers, oxidation catalysts, and the like.

Preferably, the high surface area material is in the form of particles, crystals, or agglomeration of particles or crystals, wherein the particles, crystals, or agglomeration have a $d_{50}$ particle size distribution as described herein. Other examples of high surface area materials include metal oxides such as alumina, titania, zirconia, ceria, silica, oxides of tungsten, oxides of molybdenum, and mixtures of these. These materials, when used as supports, are particularly useful for PGM-based catalyst and vanadium-based catalysts. For example, a non-zeolite based SCR catalyst can include $V_2O_5$ supported by $TiO_2/WO_3$. In another embodiment, an oxidation catalyst, AMOX catalyst, $NO_x$ absorber catalyst, or $NO_x$ trap can include a PGM metal, such as Pt, Pd, Rh, and combinations of these supported by alumina, titania, and the like.

Other examples of suitable high surface area material include molecular sieves such as aluminosilicates (zeolites), silicoaluminophosphates (SAPOs), ferrosilicates, etc. Examples of preferred molecular sieves include zeolites and SAPOs having a small pore framework (i.e., having a maximum ring size of 8). Examples of small pore molecular sieves include those having a Framework Type Code selected from the group consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON. Particularly preferred frameworks include AEI, AFT, AFX, CHA, DDR, RHO, MER, LTA, UFI, RTH, SAV, PAU, LEV, ERI, and KFI, with CHA and AEI being particularly preferred. It will be appreciated that zeolites having a specific Framework Type Code include the all isotypic framework materials defined by that Framework Type Code.

Preferred zeolites have a mole silica to alumina ratio (SAR) of less than about 30, more preferably about 5 to about 30, for example about 10 to about 25, from about 14 to about 20, from about 20 to about 30, or from about 15 to about 17. The silica-to-alumina ratio of zeolites may be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

In certain embodiments, the small pore molecular sieve comprises, consists essentially of, or consists of a disordered framework selected from the group consisting of ABC-6, AEI/CHA, AEI/SAV, AEN/UEI, AFS/BPH, BEC/ISV, beta, fuajasite, ITE/RTH, KFI/SAV, lovdarite, montesommaite, MTT/TON, pentasils, SBS/SBT, SSF/STF, SSZ-33, and ZSM-48. In a preferred embodiment, one or more of the small pore molecular sieves may comprise a CHA Framework Type Code selected from SAPO-34, AlPO-34, SAPO-47, ZYT-6, CAL-1, SAPO-40, SSZ-62 or SSZ-13 and/or an AEI Framework Type Code of selected from AlPO-18, SAPO-18, SIZ-8, or SSZ-39. In one embodiment, the mixed phase composition is an AEI/CHA-mixed phase composition. The ratio of each framework type in the molecular sieve is not particularly limited. For example, the ratio of AEI/CHA may range from about 5/95 to about 95/5, preferably about 60/40 to 40/60. In an exemplary embodiment, the ratio of AEI/CHA may range from about 5/95 to about 40/60.

Examples of catalysts useful in SCR applications include copper or iron on a zeolite having a small pore framework, such as CHA, AEI, and the like. In certain embodiments, particularly those including copper and/or iron, the catalyst metal is present on and/or within a molecular sieve material at a concentration of about 0.1 to about 10 weight percent (wt %) based on the total weight of the molecular sieve, for example from about 0.5 wt % to about 5 wt %, from about 0.5 to about 1 wt %, from about1 to about 5 wt %, about 2 wt % to about 4 wt %, and about 2 wt % to about 3 wt %. The metal may be incorporated into the molecular sieves for use in the present invention using techniques well known in the art, including liquid-phase exchange or solid-ion exchange or by an incipient wetness process. Other molecular sieve frameworks useful as SCR catalysts in the present invention include BEA, MOR, and MFI, particularly when included with one or more small-pore molecular sieves.

Catalyst composition can be in the form of a washcoat comprising the catalyst, preferably a washcoat that is suitable for coating a diesel particulate filter substrate. In addition the catalytically active component, the washcoat can include catalytically inactive components such as binders, rheology modifiers, pore forming agents, dispersants, wetting agents, and the like. As used herein, a "catalytically active" component of the washcoat is one that directly participates as a molecular component in the desired catalytic process, such as the catalytic reduction of $NO_x$ and/or oxidization of $NH_3$ or other nitrogenous-based SCR reductants. By corollary, a "catalytically inactive" is a component in the washcoat that does not directly participate as a molecular component in the desired catalytic process. Preferred inactive components include binders, such as alumina, silica, (non-zeolite) silica-alumina, naturally occurring clays, $TiO_2$, $ZrO_2$, and $SnO_2$. Although materials of similar composition may also be used as a catalytically active component, the catalytically inactive form of the material is typically distinguishable based on a physical property, such as particle size.

The catalyst coating may be deposited on the outlet side of the filter substrate by first forming a slurry of the functional catalyst and contacting the filter substrate with the slurry to allow the slurry to coat the outlet surface and/or infiltrate the filter to a desired depth which, preferably, is no greater than the depth of the outlet side of the filter. More specifically, the slurry is dosed onto the rear of the filter or the rear of the filter is dipped into the slurry so that the slurry enters the outlet channels of the filter. The slurry then forms a membrane-type coating on the outlet surface and/or partially permeates the open porous structure of the filter walls thereby forming a catalyst coating on the outlet side of the filter. In certain embodiments, a vacuum system may be attached to the front of the particulate filter to draw the catalyst washcoat partially through the channel walls. The excess slurry is removed from the particulate filter by draining, air knife, or other technique. In certain embodiments, a compressed fluid, such as compressed air, may be injected into the filter channels to assist in removing the remaining slurry. Thereafter, the particulate filter is dried.

In certain embodiments, the catalyst is exposed to temperatures of up to 950° C. In certain embodiments, the catalyst is operational at a temperature of about 150° C. to about 850° C. In a particular embodiment, the temperature range is from 175 to 550° C. In another embodiment, the temperature range is from 175 to 400° C.

According to another aspect of the invention, provided is a method for removing particulate matter, including soot, from an exhaust gas and catalyzing a reaction to effect the concentration of at least one component in the exhaust gas. Upon entering the inlet channels, the exhaust gas contacts and passes through the thin porous walls of the filter which removes soot from the exhaust gas, preferably prior to the exhaust gas contacting the catalyst coating. As particulate matter (e.g., soot) is deposited on the walls and in the porous walls, the permeability of the channel walls decreases thus causing an increase in backpressure. The permeability of the particulate filter can be restored by regenerating the filter which typically involves burning the deposited soot. Regeneration may occur actively or passively. In active regeneration, the exhaust gas upstream of the filter is periodically increased, for example, by dosing hydrocarbon into the exhaust gas stream and converting the hydrocarbon into heat over an oxidation catalyst upstream of the filter. The increase in heat facilitates soot burn to remove soot from the filter and thereby reducing backpressure.

In passive regeneration, the soot deposited on the channel walls reacts with $NO_2$ present in the exhaust gas stream causing the soot to combust and yield NO. As soot accumulates on the channel walls of the particulate filter, the reaction between the soot and $NO_2$ present in the exhaust gas stream balances with the soot loading rate when the soot load reaches a balance point below a predetermined operation limit of the particulate filter.

In addition to reducing particulate matter concentration, in certain embodiments the catalyst article reduces the concentration of $NO_x$ in the exhaust gas. In other embodiments, the catalyst article increases the concentration of NO, $NO_2$ or modifies the ratio of $NO:NO_2$. In certain embodiments, the catalyst reduces the concentration of $NH_3$ in the exhaust gas.

In certain highly preferred embodiments, the catalyst compositions described herein can promote a reaction involving a reductant, preferably ammonia, and nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., an SCR catalyst). In another embodiment, the catalyst can be formulated to favor the oxidation of ammonia with oxygen (i.e., an ammonia oxidation (AMOX) catalyst).

Sources of ammonia include ammonia reductant that is not consumed by the SCR process (i.e., ammonia slip). In yet another embodiment, an SCR catalyst and an AMOX catalyst are used in series, wherein both catalyst comprise the metal containing zeolite described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst (e.g., Pt or Pt/Pd) or a non-PGM catalyst on a high surface area support such as alumina. The AMOX catalyst can be applied to the substrate as a washcoat, preferably to achieve a loading of about 0.3 to 2.3 $g/in^3$.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2$)$_2$CO), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred. In certain embodiments, the reductant can be a hydrocarbon, such as methane, diesel fuel, or the like.

In certain embodiments, a nitrogenous reducing agent or precursor thereof, is introduced into the exhaust gas flow stream, preferably upstream of an SCR catalyst and downstream of a diesel oxidation catalyst. The introduction of this reducing agent can be accomplished by an injector, spray nozzle, or similar device. In certain embodiments, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 grams/$ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

Methods of the present invention can comprise one or more of the following steps: (a) accumulating and/or burning soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

Methods of the present invention can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, and a catalyst blend described herein. The system can include a controller for the metering the nitrogenous reductant into the flowing exhaust gas only when it is determined that the catalyst blend is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$. The control means can comprise a pre-programmed processor such as an electronic control unit (ECU).

In a further embodiment, a catalyst for oxidizing nitrogen monoxide in the exhaust gas to nitrogen dioxide can be located upstream of a point of metering the nitrogenous reductant into the exhaust gas. In one embodiment, the diesel oxidation catalyst (DOC) is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. In another embodiment, the NO to $NO_2$ is maintained at a ratio of about 1:2 to about 1:5 by volume. The diesel oxidation catalyst can include at least one platinum group metal (or some combination of these), such as platinum, palladium, or rhodium, coated on a flow-through monolith substrate. In one embodiment, the at least one platinum group metal is platinum, palladium, or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia. In a further embodiment, the zeolite catalyst for use in the present invention is coated on a filter located downstream of the oxidation catalyst. Where the filter includes the zeolite catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

As used herein, the term "consists essentially of" with respect to a catalytic composition means that the composition contains the named catalytic components but does not contain additional components that materially affect the basic and novel characteristics of the claimed invention. That is, the catalytic composition does not include additional components that would otherwise serve as a catalyst for the intended reaction or serve to enhance the basic catalytic nature of the claimed catalyst.

EXAMPLES

Example 1

Diesel Particulate Filter with Catalyst Coated Outlet

A catalytic washcoating having a copper impregnated molecular sieve having a CHA framework was washcoated from the outlet side of a honeycomb-type wall-flow filter constructed primarily of cordierite and having 300 cpsi and a wall thickness of 12 mils (0.3 mm) and then dried. Scanning Electron Microscope (SEM) imaging confirmed that the catalyst coating remained on the outlet side and interior portion of the filter wall. The inlet side of the filter wall remained free of catalyst coatings.

The washcoat was applied in an amount sufficient to form a catalyst loading of about 1 g/in$^3$. The catalyst loading had a $d_{50}$ particle size distribution of about 4.22 μm.

Examples 2-3 and Comparative Examples A-B

Diesel Particulate Filters with Catalyst Coated Outlet

Two additional samples were produced following the general procedure described in Example 1, except that the filter's mean pore size and porosity and the $d_{50}$ particle size distribution of the catalyst coating were modified as indicated in Table 1.

Two comparative samples (A and B) were produced following the general procedure described in Example 1, except that the filter's mean pore size and porosity and the $d_{50}$ particle size distribution of the catalyst coating were modified as indicated in Table 1.

Example 4

Comparative Backpressure Performance (Inlet vs. Outlet Coatings)

The procedures described in Examples 1-3 and Comparative Examples A-B were repeated, except that the catalyst coating was applied from the inlet side of the filter. The procedures described in Examples 1-3 and Comparative Examples A-B were again repeated, except that half of the catalyst coating was applied to the inlet side of the filter and half of the catalyst coating was applied to the outlet side of the filter. Ambient temperature air was passed through the filter at a rate of 400 cubic feet per minute (CFM). Soot was gradually introduced upstream of the filter and allowed to accumulate on the inlet side of the filter and the pressure differential across the filter (e.g., the filter's backpressure) was recorded as the soot level increased. The soot loaded back pressure (SLBP) of each filter was compared at a soot loading of about 2 to about 9 grams per cubic inch to determine which catalyst coating orientation (i.e., outlet only, inlet only, both inlet and outlet) yields the lowest SLBP. The results are provided in Table 2.

TABLE 2

| | Lowest Relative Soot Loaded Back Pressure (SLBP) | | |
|---|---|---|---|
| Example No. | Outlet Only | Inlet Only | Both Inlet & Outlet |
| 1 | • | | |
| 2 | • | | |
| 3 | • | | |
| A | | | • |
| B | | • | |

As this data shows, the SLBP of filters according to the present invention is lower than filters having other catalyst coating configurations.

The invention claimed is:

1. A diesel particulate filter comprising:
   a. a wall-flow filter substrate having a mean pore size, an inlet side, an outlet side having an outlet surface, and a porous interior between the inlet and outlet sides; and
   b. a catalyst composition having a $d_{50}$ particle size distribution, said $d_{50}$ particle size distribution of the catalyst composition being greater than or equal to the mean pore size of the substrate divided by 4.9, where the mean pore size of the substrate is about 12 μm to about 20 μm and at least about 50% of the pores are within this range based on the total pore volume and/or total number of pores;
   where the catalyst composition is a coating on the surface of the outlet side and the composition has a concen-

TABLE 1

| Example/ (Comparative Example) | Filter Porosity | Filter Mean Pore Size | (Mean Pore Size)/4.9 (min. required particle size) | $d_{50}$ Particle Size Distribution of the Catalyst Coating | $d_{50}$ Particle Size Distribution above minimum? | Washcoat Loading |
|---|---|---|---|---|---|---|
| 1 | 65% | 20 μm | 4.08 μm | 4.22 μm | YES | 1 g/in$^3$ |
| 2 | 59% | 18 μm | 3.67 μm | 4.22 μm | YES | 1 g/in$^3$ |
| 3 | 52% | 13 μm | 2.65 μm | 3.76 μm | YES | 1 g/in$^3$ |
| (A) | 65% | 20 μm | 4.08 μm | 1.47 μm | NO | 1 g/in$^3$ |
| (B) | 59% | 18 μm | 3.67 μm | 1.47 μm | NO | 1 g/in$^3$ | tration gradient between the outlet surface of the filter and the inlet side of the filter, wherein the concentration is greatest towards the outlet surface, the inlet side of the substrate is substantially free of a catalyst coating, and the diesel particulate filter provides a backpressure after exposure to soot that is less than the backpressure on a filter having the same catalyst composition on: (1) the inlet side only or (2) on both the inlet and outlet sides where half of the catalyst coating was applied to the inlet side of the filter and half of the catalyst coating was applied to the outlet side of the filter.

2. The diesel particulate filter of claim 1, wherein the mean pore size is at least about 15 µm.

3. The diesel particulate filter of claim 1, wherein the wall-flow filter substrate further comprises a porosity of at least about 45 percent.

4. The diesel particulate filter of claim 1, wherein the wall-flow filter substrate further comprises a porosity of at least about 55 percent.

5. The diesel particulate filter of claim 1, wherein the wall-flow filter substrate further comprises a porosity of at least about 65 percent.

6. The diesel particulate filter of claim 1, wherein said $d_{50}$ particle size distribution is at least about 2.5 microns.

7. The diesel particulate filter of claim 1, wherein said $d_{50}$ particle size distribution is at least about 3.5 microns.

8. The diesel particulate filter of claim 1, wherein said $d_{50}$ particle size distribution is at least about 4 microns.

9. The diesel particulate filter of claim 1, wherein the porous interior is substantially free of a catalyst coating.

10. The diesel particulate filter of claim 1, wherein the catalyst composition is present in an amount of about 0.5-3.0 g/in$^3$.

11. The diesel particulate filter of claim 1, wherein the catalyst composition is present in an amount of about 0.9-1.8 g/in$^3$.

12. The diesel particulate filter of claim 1, wherein the catalyst composition is present as a single layer.

13. The diesel particulate filter of claim 1, wherein the catalyst composition is present on the outlet side of the filter as two or more layers.

14. The diesel particulate filter of claim 1, wherein the catalyst composition comprises a selective reduction catalyst.

15. The diesel particulate filter of claim 14, wherein said selective reduction catalyst comprises Cu or Fe on and/or within a small pore molecular sieve.

16. The diesel particulate filter of claim 1, wherein the catalyst composition comprises an ammonia slip catalyst.

17. The diesel particulate filter of claim 1, the catalyst composition having a $d_{10}$ particle size distribution of one or more of at least 0.75 µm, at least about 1 µm, about 1 to about 1.5 µm, about 1 to about 2 µm, about 1 µm, about 2 µm, or about 3 µm.

18. The diesel particulate filter of claim 1, the catalyst composition having a $d_{10}$ particle size distribution and a $d_{90}$ particle size distribution, where the catalyst composition has:
  a. a $d_{10}$ particle size distribution of about 1 to about 1.5 µm, a $d_{50}$ particle size distribution of about 3.75 to about 4.5 µm, and a $d_{90}$ particle size distribution of about 7.5 to about 9 µm, or
  b. a $d_{10}$ particle size distribution of about 1.5 to about 2 µm, a $d_{50}$ particle size distribution of about 3.5 to about 4 µm, and a $d_{90}$ particle size distribution of about 7 to about 8 µm.

19. The diesel particulate filter of claim 1, wherein at least about 75% of the pores are a mean pore size of the 12 µm to about 20 µm.

20. The diesel particulate filter of claim 1, the catalyst composition having a $d_{10}$ particle size distribution and a $d_{90}$ particle size distribution, where the catalyst composition has:
  (a) a $d_{10}$ particle size distribution of at least 0.75 µm, at least about 1 µm, about 1 to about 2 µm, about 1 to about 1.5 µm, 1 µm, 2 µm, or 3 µm, and
  (b) a $d_{90}$ particle size distribution of one or more of less than about 15 µm, less than about 10 µm, 8 µm, 7 µm, or 6 µm.

21. A system for treating a lean-burn exhaust gas comprising:
  a. a diesel particulate filter according to claim 1; and
  b. at least one exhaust system component in fluid communication with the diesel particulate filter, wherein the exhaust system component is selected from the group consisting of a source of $NO_2$ disposed upstream of the diesel particulate filter, a source of reductant disposed upstream of the diesel particulate filter, an AMOX catalyst, a NOx trap, a NOx absorber catalyst, a diesel oxidation catalyst, and an SCR catalyst.

22. A method for reducing soot in a lean burn exhaust gas comprising:
  a. contacting an exhaust gas stream carrying soot and optionally containing $NO_x$, with a diesel particulate filter according to claim 1;
  b. trapping at least a portion of the soot on and/or in the diesel particulate filter while allowing the exhaust gas to pass through the diesel particulate filter; and
  c. periodically and/or continuously burning the trapped soot to regenerate the filter.

23. The method of claim 22 further comprising the step of:
  contacting the exhaust gas with a SCR catalyst coated from the outlet side of the filter to reduce the concentration of NOx in exhaust gas.

* * * * *